(12) United States Patent
Kitajima et al.

(10) Patent No.: US 11,305,215 B2
(45) Date of Patent: Apr. 19, 2022

(54) FILTER DEVICE

(71) Applicant: YAMASHIN-FILTER CORP., Kanagawa (JP)

(72) Inventors: Nobuyuki Kitajima, Kanagawa (JP); Mitsuhiro Yamaguchi, Kanagawa (JP)

(73) Assignee: YAMASHIN-FILTER CORP., Kanagawa (JP)

( * ) Notice: Subject to any disclaimer, the term of this patent is extended or adjusted under 35 U.S.C. 154(b) by 117 days.

(21) Appl. No.: 16/826,025

(22) Filed: Mar. 20, 2020

(65) Prior Publication Data
US 2020/0215464 A1 Jul. 9, 2020

Related U.S. Application Data

(63) Continuation of application No. PCT/JP2018/042071, filed on Nov. 14, 2018.

(30) Foreign Application Priority Data

Nov. 17, 2017 (JP) .............................. JP2017-222305

(51) Int. Cl.
*B01D 29/15* (2006.01)
*B01D 29/60* (2006.01)
(Continued)

(52) U.S. Cl.
CPC ............. *B01D 29/15* (2013.01); *B01D 29/60* (2013.01); *B01D 35/005* (2013.01);
(Continued)

(58) Field of Classification Search
CPC ...... B01D 29/15; B01D 29/60; B01D 35/005; B01D 35/1475; B01D 35/30;
(Continued)

(56) References Cited

U.S. PATENT DOCUMENTS 3,333,697 A 8/1967 Rosaen
3,382,978 A * 5/1968 Rosaen .................. B01D 29/15
210/90

(Continued)

FOREIGN PATENT DOCUMENTS

EP 3597282 A1 1/2020
JP S57-140815 U 9/1982
(Continued)

OTHER PUBLICATIONS

International Search Report issued in PCT/JP2018/042071 dated Dec. 11, 2018 with English Translation (5 pages).
(Continued)

*Primary Examiner* — Madeline Gonzalez
(74) *Attorney, Agent, or Firm* — Nakanishi IP Associates, LLC

(57) ABSTRACT

A filter device that facilitates maintenance is provided. A case that internally includes a filter element includes a lid body. The lid body includes a flange portion having a substantially cylindrical shape fixed to the case and a cover having a substantially plate shape detachably provided to the flange portion. The flange portion has a first hole, and the cover has a second hole. The first hole and the second hole communicate between a space inside the case and a space outside the case.

5 Claims, 5 Drawing Sheets

(51) Int. Cl.
*B01D 35/30* (2006.01)
*B01D 35/147* (2006.01)
*B01D 35/00* (2006.01)

(52) U.S. Cl.
CPC ......... *B01D 35/1475* (2013.01); *B01D 35/30* (2013.01); *B01D 2201/301* (2013.01)

(58) Field of Classification Search
CPC .. B01D 2201/301; B01D 29/56; B01D 29/21; B01D 29/114; B01D 29/608; B01D 35/0276; B01D 35/147; B01D 29/11; B01D 24/48; B01D 35/14; B01D 35/027; C02F 2201/005
USPC ............ 210/109, 97, 103, 172.1, 172.2, 130
See application file for complete search history.

(56) References Cited

U.S. PATENT DOCUMENTS

| | | | |
|---|---|---|---|
| 2018/0050285 A1 | 2/2018 | Klein et al. | |
| 2018/0147511 A1 | 5/2018 | Kitajima et al. | |
| 2018/0229162 A1 | 8/2018 | Oshita et al. | |
| 2020/0016519 A1 | 1/2020 | Ishizuka | |

FOREIGN PATENT DOCUMENTS

| | | |
|---|---|---|
| JP | H03-47010 U | 4/1991 |
| JP | H08-268303 A | 10/1996 |
| JP | 2010-149007 A | 7/2010 |
| JP | 2013-000608 A | 1/2013 |
| JP | 2017-80716 A | 5/2017 |
| JP | 2018-86625 A | 6/2018 |
| WO | 2016/146227 A1 | 9/2016 |
| WO | 2018/086724 A1 | 5/2018 |
| WO | 2018/147212 A1 | 8/2018 |

OTHER PUBLICATIONS

Extended European Search Report issued in European Patent Application No. 18877355.0, dated Nov. 16, 2020 (8 pages).
Office Action issued in European Patent Application No. 18877355.0 dated Jul. 28, 2021 (6 pages).

* cited by examiner

FILTER DEVICE

CROSS-REFERENCE TO RELATED APPLICATIONS

This application is a continuation application of International Patent Application No. PCT/JP2018/042071 filed on Nov. 14, 2018, which claims priority to Japanese Patent Application No. 2017-222305 filed on Nov. 17, 2017, the entire contents of which are incorporated by reference.

TECHNICAL FIELD

The present invention relates to a filter device.

BACKGROUND ART

Patent Document 1 discloses an oil filter inside of which an element is disposed, a case body having inflow holes and an outflow hole that communicate between an element-disposed space and an outside, and a cover member removably attached to the case body so as to obstruct an upper opening of the element-disposed space. An indicator is provided on a top surface side of the cover member. The indicator is activated based on a differential pressure between an inflow space side and an outflow space side of the filter element.

CITATION LIST

Patent Document

Patent Document 1: JP 2010-149007 A

In the cited Patent Document 1, the cover member is removed from the case body to replace the element. However, because the indicator is provided on the cover member, the indicator is removed together with the cover member. In general, for example, wiring is provided on the indicator, and, for example, the wiring is provided on the case body side. Therefore, in the invention described in Patent Document 1, for example, the wiring needs to be taken care of during replacement of the element, causing a problem of difficulty in maintenance.

SUMMARY OF INVENTION

One or more embodiments of the present invention is to provide a filter device that facilitates maintenance.

A filter device according to one or more embodiments of the present invention, for example, includes a case, a filter element, a lid body, and an inflow portion and an outflow portion. The case has a substantially bottomed tubular shape with an open upper end. The filter element having a substantially cylindrical shape is provided inside the case. The lid body is provided on the case so as to cover the upper end of the case. The inflow portion and the outflow portion are provided in the case. The inflow portion and the outflow portion communicate between an internal space and an external space of the case. The lid body includes a flange portion and a cover. The flange portion having a substantially cylindrical shape is fixed to the case. The cover having a substantially plate shape is provided on an upper side of the flange portion so as to cover a hollow portion of the flange portion. The cover is detachably provided to the flange portion. The flange portion has a first hole. The cover has a second hole. The first hole and the second hole communicate between the space inside the case and the space outside the case.

According to the filter device according to one or more embodiments of the present invention, the case that internally includes the filter element includes the lid body. The lid body includes the flange portion having the substantially cylindrical shape fixed to the case and the cover having the substantially plate shape detachably provided to the flange portion. The flange portion has the first hole, and the cover has the second hole. The first hole and the second hole communicate between the space inside the case and the space outside the case. Accordingly, air is flown into the inside the case via the first hole and the second hole to flow out the liquid from the case, thus facilitating maintenance. In addition, the filter element can be replaced without removing a sensor or a detection unit (e.g., a detector that measures and/or indicates environmental parameter(s), such as temperature and pressure) disposed at the flange portion, thus facilitating maintenance.

Here, the filter device may be configured as follows. The filter device includes a valve provided on the cover. The valve includes a valve seat having a substantially cylindrical shape provided on the cover. The valve seat has a third hole. The first hole, the second hole, and the third hole communicate between the space inside the case and the space outside the case. Thus, while the valve required to obviate a failure of the filter device is provided, the space inside the case can be communicated with the space outside the case.

Here, the filter device may be configured as follows. The filter device includes the detection unit (e.g., a detector that measures and/or indicates environmental parameter(s), such as temperature or pressure) disposed at the flange portion. The flange portion has a fourth hole on a side surface where the detection unit is accommodated. The fourth hole has an opening covered with the detection unit by providing the detection unit in the fourth hole. That is, the fourth hole is closed with the body of the detection unit. The first hole has one end opening to a side surface or a bottom surface of the fourth hole. The first hole and the second hole communicate between a space inside the fourth hole and the space inside the case. Accordingly, the pressure and the temperature inside the case can be measured by the sensor via the first hole and the second hole. Additionally, providing the sensor on the flange portion allows replacing the filter element without removing the sensor.

Here, the filter device may be configured as follows. The case is provided inside a tank. The lid body is provided on an upper side of the tank. The second hole with a substantially U shape has both ends opening to a surface on a lower side of the lid body. The first hole is a hole penetrating in a thickness direction of the flange portion. The tank has a fifth hole at a position overlapping with the first hole in a plan view. The first hole, the second hole, and the fifth hole communicate between the space inside the case and a space outside the case and inside the tank. This allows air inside the tank to be delivered to the inside of the case, and after the flow of the liquid stops, the liquid can be automatically flown out from the case. Also, the liquid overflowing from the case can be returned to the tank.

Here, the filter device may be configured as follows. The filter device includes a valve provided on the cover. A sixth hole is formed in the valve. The first hole, the second hole, the fifth hole, and the sixth hole communicate between the space inside the case and the space outside the case and inside the tank. Thus, while the valve required to obviate a failure of the filter device is provided, the space inside the case can be communicated with the space outside the case and inside the tank.

One or more embodiments of the present invention allows providing the filter device that facilitates the maintenance.

DESCRIPTION OF EMBODIMENTS

Hereinafter, with reference to the drawings, detailed description will be made on embodiments of the present invention. In the present embodiment, while hydraulic oil is described as an example of liquid to be filtered, the liquid to be filtered is not limited to the hydraulic oil. Also, while the following embodiments are described with an example of a return filter, a filter device of the present invention is not limited to the return filter.

Figure 1:
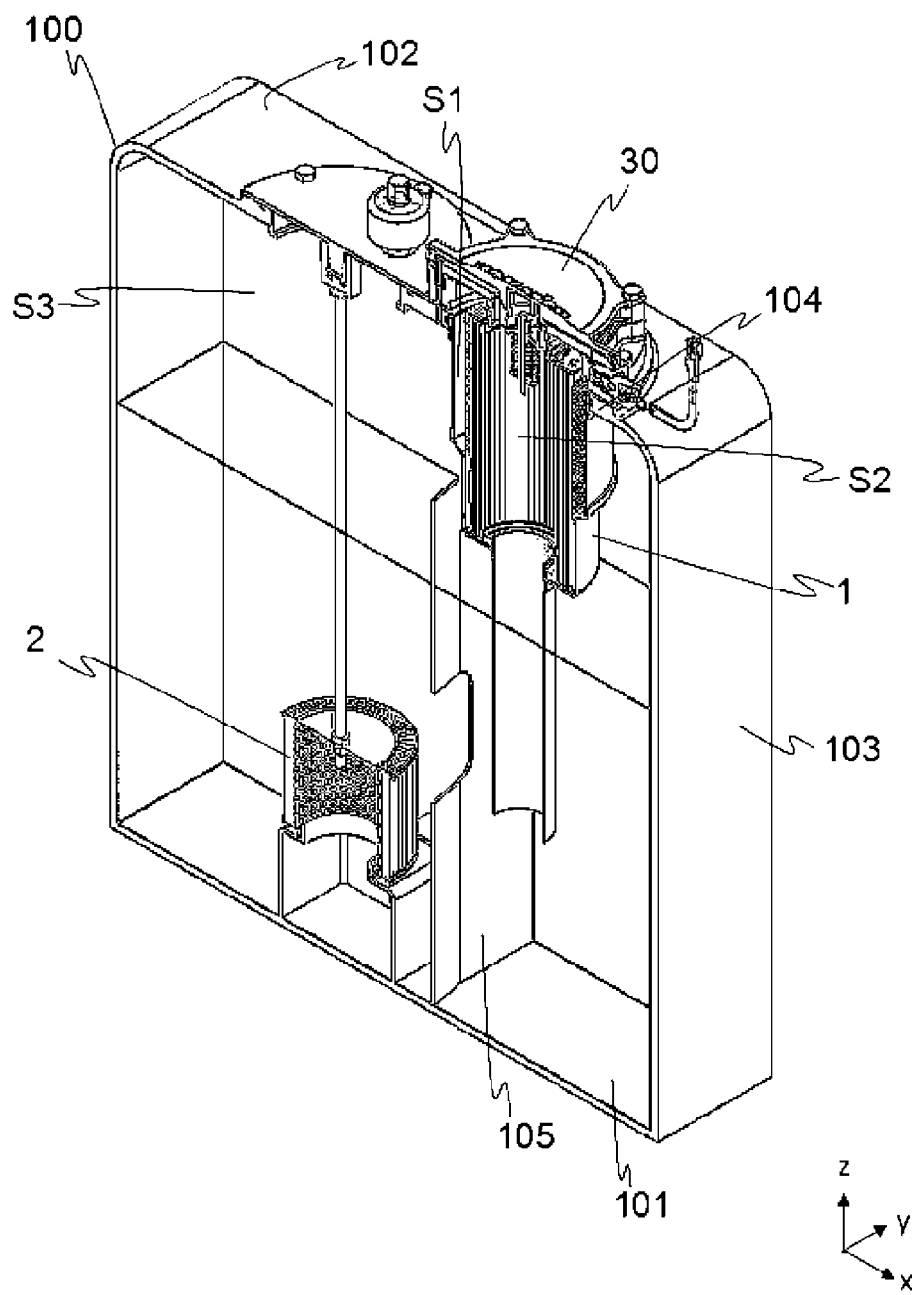
FIG. 1 is a cross-sectional view of a main part illustrating an overview of a tank 100 in which a return filter 1 according to one embodiment of the present invention is provided.

FIG. 1 is a cross-sectional view illustrating an overview of a tank 100 in which a return filter 1 according to one embodiment of the present invention is provided. In FIG. 1, hatching for indicating a cross section is omitted.

The tank 100 is a tank for storing hydraulic oil. The tank 100 is installed in a work machine (not illustrated) (e.g., a hydraulic device), and is provided in a hydraulic circuit of hydraulic oil supplied to the hydraulic device. However, the tank 100 is not limited to one provided in the hydraulic circuit.

The tank 100 is, for example, formed in a box-like shape and hollow inside. The tank 100 mainly has a bottom surface 101, a top surface 102 opposed to the bottom surface 101, and side surfaces 103 substantially orthogonal to the bottom surface 101 and the top surface 102. An opening 102a (see FIG. 2) is formed in the top surface 102.

A mounting plate 104 for mounting the return filter 1 is provided on an upper side (+z-side) of the top surface 102. A through-hole 104a (see FIG. 2) is formed in the mounting plate 104. The return filter 1 is inserted into an inside of the tank 100 from the opening 102a and the through-hole 104a. The opening 102a and the through-hole 104a are covered with a lid body 30 (described in detail later) of the return filter 1.

Note that the mounting plate 104 is not necessarily required. For example, when a thickness of the top surface 102 of the tank 100 is thickened such that the top surface 102 meets the functionality of the mounting plate 104, the mounting plate 104 is unnecessary. In the present invention, the tank 100 includes the mounting plate 104.

Figure 2:
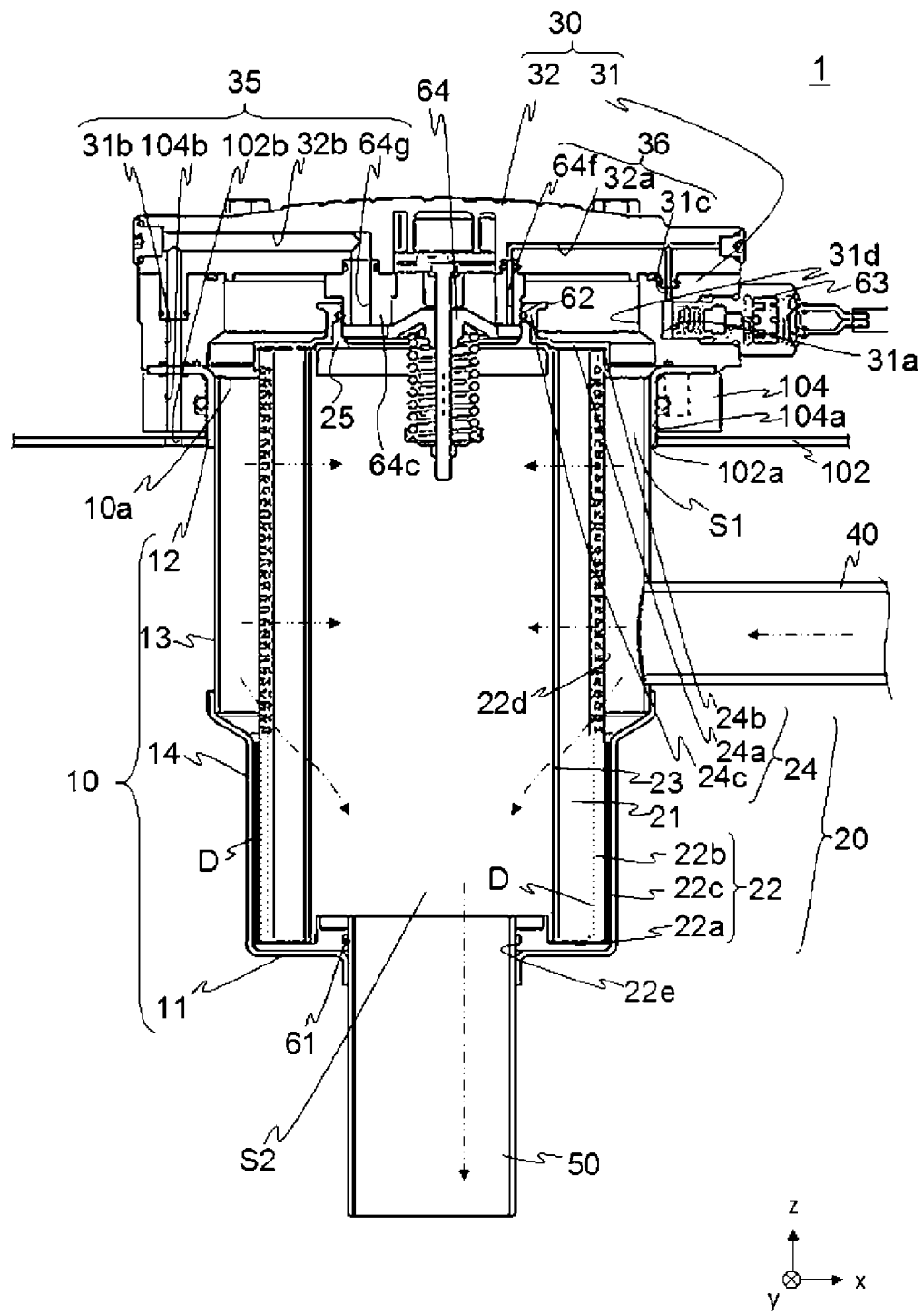
FIG. 2 is a cross-sectional view illustrating an overview of the return filter 1.

An inflow portion 40 (see FIG. 2. FIG. 1 omits the illustration) that causes the hydraulic oil to flow into the inside of the return filter 1 is inserted through the side surface 103. The inflow portion 40 introduces the hydraulic oil from an outside of the tank 100 to the return filter 1. The hydraulic oil introduced into the return filter 1 is filtered by the return filter 1 and stored in the tank 100.

An outflow port (not illustrated) that causes the hydraulic oil in the tank 100 to flow out to, for example, a hydraulic pump (not illustrated) is formed in the vicinity of the bottom surface 101. A suction strainer 2 is provided inside the tank 100. The hydraulic oil that has passed through the suction strainer 2 flows out from the outflow port to the outside of the tank 100.

A partition plate 105 is provided inside the tank 100 such that the hydraulic oil that has flown out from the return filter 1 does not directly contact the suction strainer 2. Note that the partition plate 105 is not necessarily required.

Next, the return filter 1 will be described. FIG. 2 is a cross-sectional view illustrating an overview of the return filter 1. In FIG. 2, hatching for indicating a cross section is omitted.

The return filter 1 mainly includes a case 10, a filter element 20, the lid body 30, the inflow portion 40, and an outflow portion 50.

The case 10 is formed of a material having high corrosion resistance (e.g., metal such as stainless steel). The case 10 is provided inside the tank 100 so as to protrude from the top surface 102 of the tank 100 to a lower side (−z-side) (see FIG. 1).

The case 10 has a bottomed substantially tubular shape and has an open upper end surface. The case 10 is hollow inside and internally includes, for example, the filter element 20.

The case 10 has a bottom surface 11. The outflow portion 50 is provided so as to penetrate the bottom surface 11. The outflow portion 50 communicates between a space inside the filter element 20 and a space outside the case 10.

A mounting member 12 is provided in the vicinity of an upper end of the case 10. The case 10 is provided in the tank 100 (here, to the mounting plate 104) via the mounting member 12. Furthermore, the mounting member 12 integrates the case 10 and a flange portion 31 (described in detail later).

The case 10 has two tubular portions 13 and 14 with different diameters. The tubular portion 14 has the diameter smaller than the diameter of the tubular portion 13. The tubular portion 14 is provided on a lower side of the tubular portion 13.

The inflow portion 40 is provided for the tubular portion 13. The inflow portion 40 communicates between a space inside the case 10 and outside the filter element 20 (space S1) and a space outside the case 10 and inside the tank 100 (space S3, see FIG. 1). An inflow of the hydraulic oil from the inflow portion 40 stores the hydraulic oil in the case 10.

The filter element 20 is a member having a bottomed substantially tubular shape and provided inside the case 10. The filter element 20 mainly includes a filter medium 21, an outer tube portion 22, an inner tube 23, a plate 24, and a plate 25. The outer tube portion 22, the inner tube 23, and the plate 24 are integrated with the filter medium 21.

Figure 3:
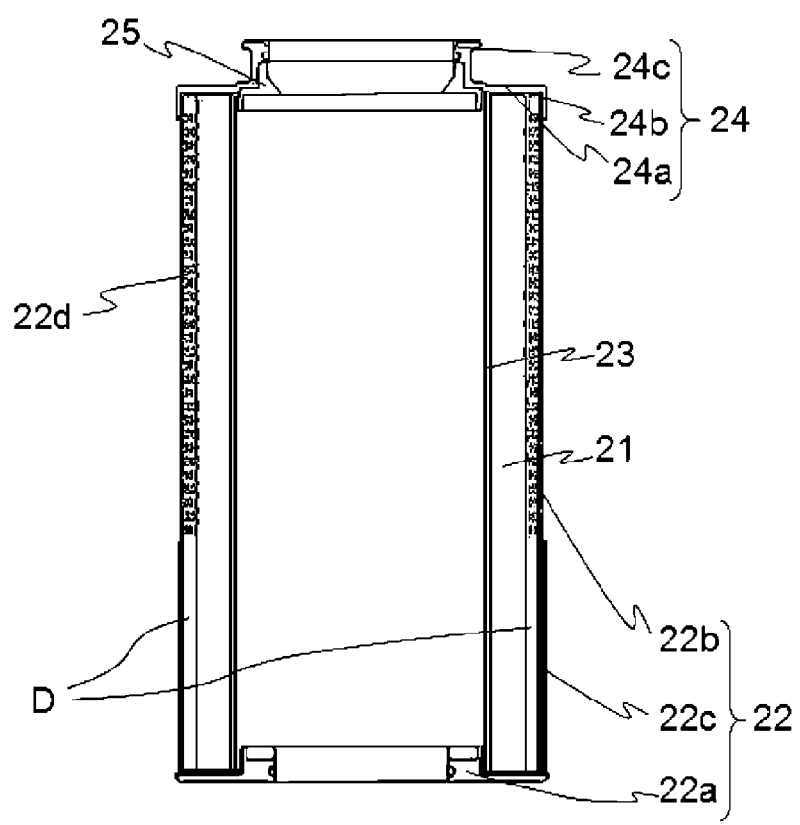
FIG. 3 is a cross-sectional view illustrating an overview of a filter element 20.
Figure 3:
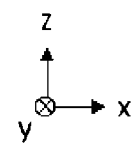

FIG. 3 is a cross-sectional view illustrating an overview of the filter element 20. In FIG. 3, hatching for indicating a cross section is omitted. The filter medium 21 is a member having a substantially cylindrical shape and having openings at both ends. The filter medium 21 is formed by pleating a filter paper using, for example, synthetic resin or a paper, and connecting both ends of the pleated filter paper to form a cylindrical shape. The inner tube 23 where holes through which the hydraulic oil passes are formed in a substantially entire area is provided inside the filter medium 21.

The outer tube portion 22 is provided on an end on a lower side of the filter medium 21 and outside the filter medium 21. The outer tube portion 22 mainly includes a plate-like portion 22a having a substantially circular plate shape provided along a lower end surface of the filter medium 21, and tubular portions 22b and 22c outside the filter medium 21 provided substantially parallel to the filter medium 21.

The plate-like portion 22a is a substantially circular plate-shaped member having the central portion thicker than its peripheral edge portion, and has a hole 22e in the center. The outflow portion 50 is inserted into the hole 22e. The hole 22e and the outflow portion 50 are sealed by a sealing member (for example, an O-ring) 61.

The tubular portion 22b has a height substantially the same as a height of the filter medium 21. The tubular portion 22c has a height lower than that of the filter medium 21 and abuts on an outer circumferential surface of the tubular portion 22b. The tubular portion 22b and the tubular portion 22c are integrated. A clearance is provided between the tubular portion 22b and the filter medium 21. This clearance serves as a dust pocket D (described in detail later). Note that although it is only necessary that the tubular portion 22b does not abut on the filter medium 21, as illustrated, the clearance of approximately half the thickness of the filter medium 21 is desirably present between the tubular portion 22b and the filter medium 21.

As illustrated in FIG. 2, in a state where the filter element 20 is provided inside the case 10, the plate-like portion 22a abuts on a bottom surface 11, and the tubular portion 22c abuts on the tubular portion 14. As a result, the hydraulic oil does not flow into between the filter element 20 (tubular portion 22c) and the tubular portion 14.

Note that "the tubular portion 22c abuts on the tubular portion 14" described here includes a case where a fine clearance is formed between the tubular portion 22c and the tubular portion 14 so that the filter element 20 (tubular portion 22c) can move relative to the tubular portion 14. In other words, the state where the hydraulic oil does not enter between the tubular portion 22c and the tubular portion 14 is referred to as a state where "the tubular portion 22c abuts on the tubular portion 14." For example, a case where about 0.5 mm clearance is provided between the tubular portion 22c and the tubular portion 14 is also included in the case where "the tubular portion 22c abuts on the tubular portion 14."

Holes 22d through which the hydraulic oil passes are formed in a substantially entire area of a part of the tubular portion 22b on which the tubular portion 22c does not abut. Meanwhile, the hole 22d is not formed in a part on which the tubular portion 22c abuts. Moreover, the hole 22d is not formed in the tubular portion 22c. In other words, the holes 22d are formed in the substantially entire area of the part not abutting on the tubular portion 14 of the tubular portions 22b and 22c, and the hole 22d is not formed in the part abutting on the tubular portion 14 of the tubular portions 22b and 22c.

Note that in the present embodiment, while the hole 22d is not formed in the part abutting on the tubular portion 14 of the tubular portion 22b, the hole 22d may be formed in the substantially entire area of the tubular portion 22b. The tubular portion 22c covers an outside of the tubular portion 22b, and therefore even when the holes 22d are formed in the substantially entire area of the tubular portion 22b, it can be said that the holes 22d are not formed in the part abutting on the tubular portion 14 of the tubular portions 22b and 22c.

The description will now return to FIG. 3. The plate 24 is provided on an end on the upper side of the filter medium 21. The plate 24 covers upper end surfaces of the filter medium 21, the outer tube portion 22, and the inner tube 23.

The plate 24 mainly includes a plate-like portion 24a having a substantially circular plate shape provided along an upper end surface of the filter medium 21, a tubular portion 24b outside the tubular portion 22b provided substantially parallel to the tubular portion 22b, and a tubular portion 24c provided on an inner peripheral edge of the plate-like portion 24a. The tubular portion 24b protrudes downward (in the −z direction) from the plate-like portion 24a and abuts on the tubular portion 22b. The tubular portion 24c protrudes upward (in the +z direction) from the plate-like portion 24a. The plate 25 is provided on a lower side of the tubular portion 24c. Note that the plate 25 may be part of the plate 24.

The description will now return to FIG. 2. The lid body 30 is provided outside the tank 100 (in the present embodiment, an upper side of the mounting plate 104 provided outside the tank 100). The lid body 30 is provided on the case 10 (here, the mounting member 12) and the plate 24 (here, the tubular portion 24c) so as to cover the opening of the upper end surface of the case 10.

The lid body 30 mainly includes the flange portion 31 and a cover 32. The flange portion 31 has a substantially cylindrical shape and is fixed to the case 10 (here, the mounting member 12). The cover 32 is a substantially plate-shaped member and provided on the upper side (+z-side) of the flange portion 31 so as to cover a hollow portion of the flange portion 31. The cover 32 is detachably provided to the flange portion 31.

Figure 4:
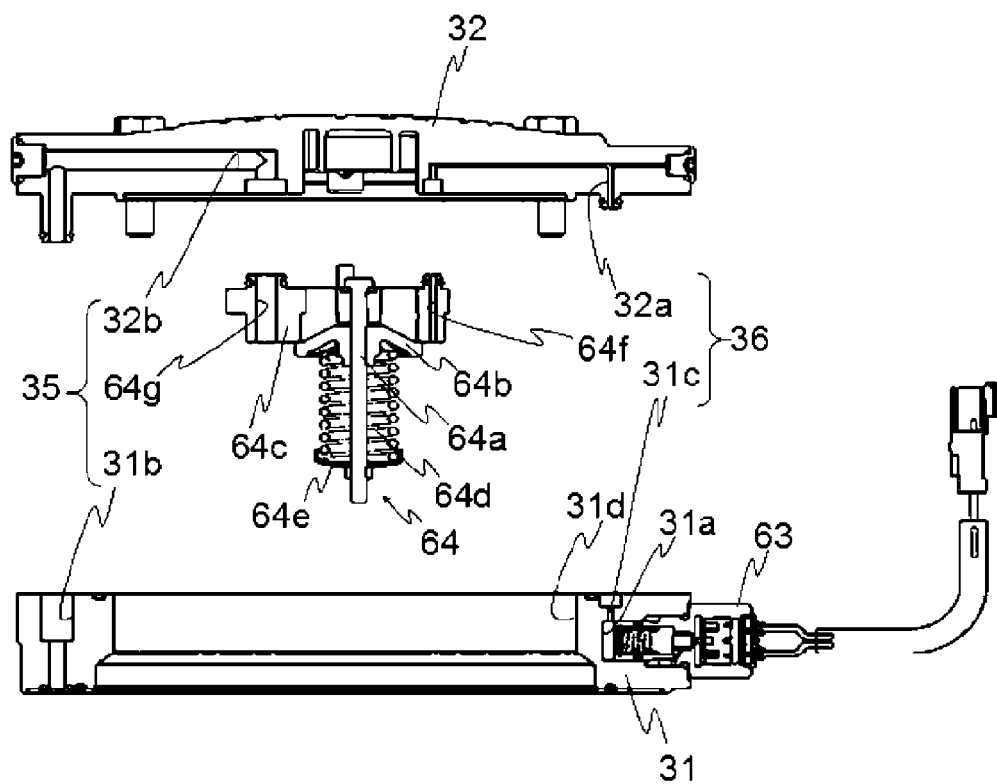
FIG. 4 is an exploded cross-sectional view of a lid body 30.
Figure 4:
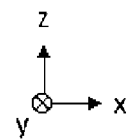
Figure 5:
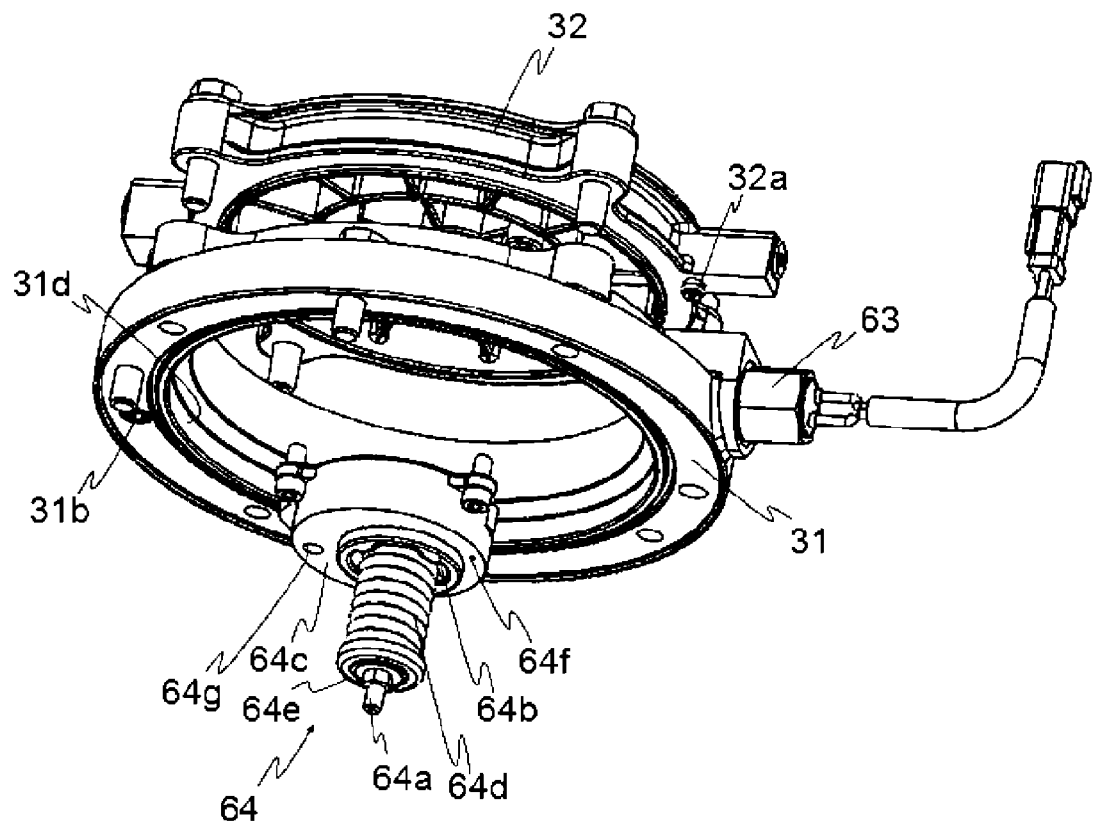
FIG. 5 is an exploded perspective view of the lid body 30.

FIG. 4 is an exploded cross-sectional view of the lid body 30, and FIG. 5 is an exploded perspective view of the lid body 30. The flange portion 31 has a hole 31d having a substantially columnar shape in the center. The hole 31d has a diameter substantially the same as an inner diameter of the tubular portion 13 (see FIG. 2). When the filter element 20 is replaced, the filter element 20 is removed from the case 10 via the hole 31d.

The flange portion 31 has a hole 31a on its side surface. An indicator 63 is attached to the hole 31a. The indicator 63 detects a difference between a pressure inside the case 10 and a pressure outside the case. Providing the indicator 63 in the hole 31a covers the opening of the hole 31a with the indicator 63.

A valve 64 is provided on the cover 32. The valve 64 is provided to protrude to a lower side (−z-side) of the cover 32. The valve 64 mainly includes a valve rod 64a, a valve body 64b movable along the valve rod 64a, a valve seat 64c having a substantially cylindrical shape, and an elastic member 64d having one end on a flange 64e, which is provided on the valve rod 64a, and the other end on the valve body 64b.

As illustrated in FIG. 2, the valve seat 64c is inserted into the tubular portion 24c, and the valve 64 is inserted into a hollow portion (space S2) of the filter element 20. The valve seat 64c and the tubular portion 24c are sealed by a sealing member (for example, an O-ring) 62.

The description will now return to FIG. 4. Usually, as illustrated, the valve body 64b abuts on the valve seat 64c and the valve 64 is closed. When the filter medium 21 is clogged and a pressure inside the case 10 increases, the valve body 64b moves downward and away from the valve seat 64c against a biasing force from the elastic member 64d to open the valve 64. Thus, flowing the hydraulic oil from the space inside the case 10 and outside the filter element 20 (space S1) to the space inside the filter element 20 obviates damage of the return filter 1.

The valve seat 64c has holes 64f and 64g. As illustrated in FIG. 4, the holes 64f and 64g are holes penetrating in a thickness direction (z direction) of the valve seat 64c and ends on the lower sides open to the space S2. The hole 64f is part of a flow path 36, and the hole 64g is part of a flow path 35. The flow paths 35 and 36 communicate between the space inside the case 10 and the space outside the case 10. The flow paths 35 and 36 will be described below using FIG. 4.

The flow path 35 communicates between the space S2 (see FIG. 2) and the space S3 (see FIG. 1). The cover 32 has a hole 32b. The hole 32b with a substantially U shape has both ends opening to a surface on a lower side of the cover 32. The flange portion 31 has a hole 31b. The hole 31b has one end opening to a surface on an upper side of the flange portion 31 and the other end opening to a surface on a lower side of the flange portion 31. The hole 64g and the hole 32b are connected, the hole 32b and the hole 31b are connected, and the hole 64g, the hole 32b, and the hole 31b constitute the flow path 35.

The flow path 36 communicates between the space S2 (see FIG. 2) and a space outside the case 10 and the tank 100 (here, an internal space of the hole 31a). The cover 32 has a hole 32a. The hole 32a with a substantially U shape has both ends opening to the surface on the lower side of the cover 32. The flange portion 31 has a hole 31c. The hole 31c has one end opening to the surface on the upper side of the flange portion 31 and the other end opening to a side surface (may be a bottom surface) of the hole 31a.

The hole 64f and the hole 32a are connected, the hole 32a and the hole 31c are connected, and the hole 64f, the hole 32a, and the hole 31c constitute the flow path 36.

The description will now return to FIG. 2. The flow path 35 further has a hole 104b formed in the mounting plate 104 and a hole 102b formed in the top surface 102. The hole 104b penetrates the mounting plate 104 in the z direction and the hole 102b penetrates the top surface 102 in the z direction. The hole 31b and the hole 104b are connected, and the hole 104b and the hole 102b are connected. In this manner, the flow path 35 with the substantially U shape as a whole has one end opening to the hollow portion of the case 10 (here, the space S2) and the other end opening to the inside of the tank 100 (here, the space S3).

Next, the functionality of the return filter 1 thus configured will be described. The dash-dotted line arrows in FIG. 2 indicate a flow of the hydraulic oil.

For example, when the work machine starts driving, the hydraulic oil starts flowing the inside of the hydraulic circuit. In association with this, the hydraulic oil flows into the space S1 and the inside of the case 10 is filled with the hydraulic oil. Because the inside of the case 10 (spaces S1 and S2) is filled with initial air, as a position of an oil surface in the case 10 rises (moves in the +z direction), the initial air passes through the flow path 35 and is discharged to the space S3.

The hydraulic oil flowing into the space S1 flows from the outside to the inside of the filter medium 21, and the filter medium 21 removes, for example, dust in the hydraulic oil. The hydraulic oil after filtration flows out to the space S2. After that, the hydraulic oil after filtration flows out from the outflow portion 50 to the space S3. Furthermore, the hydraulic oil after filtration that has not flown out from the outflow portion 50 flows out to the space S3 via the flow path 35.

Also, the flow path 36 communicates between the space S2 and the hole 31a and the opening of the hole 31a is covered with the indicator 63, so the pressure in the space S2 can be measured by the indicator 63.

Since the repeated filtration clogs the filter medium 21 to increase the pressure of the space S1, the filter element 20 is replaced. To replace the filter element 20, the work machine is stopped first. As the work machine stops, the hydraulic oil ceases to flow into the space S1, and thus the oil surface in the case 10 lowers. In the process, the dust captured by the filter medium 21 falls in the −z direction and remains in the dust pocket D between the filter medium 21 and the tubular portion 22c.

Here, the flow path 35 is formed in the lid body 30. Therefore, the air passes through the flow path 35 and flows from the space S3 into the spaces S1 and S2, thus gradually lowering the oil surface even without removing the cover 32 from the flange portion 31 (synonymous with the case 10). Accordingly, when a certain amount of period (for example, approximately five minutes) has passed after the work machine stops, the oil surface lowers with respect to the bottom surface 11 without removing the cover 32 from the flange portion 31 (case 10).

In this way, the hydraulic oil stored in the case 10 is all discharged to the tank 100. Because the dust does not pass through the filter medium 21, the dust remains in the dust pocket D and the hydraulic oil after filtration passes through the filter medium 21. In addition, because the tubular portion 22c abuts on the tubular portion 14, the hydraulic oil prior to filtration does not accumulate between the tubular portion 22c and the tubular portion 14.

When the cover 32 of the lid body 30 is removed from the flange portion 31, the filter element 20 can be extracted via an open end 10a on the upper portion of the case 10 and the hole 31d. Since the indicator 63 is provided on the flange portion 31, the indicator 63 remains attached to the case 10 side when the filter element 20 is replaced, and therefore the indicator 63 is not removed from the case 10 together with the cover 32. Therefore, an additional work, such as removing, for example, the wiring provided on the indicator 63 is unnecessary, thus facilitating maintenance.

Furthermore, since the flow paths 35 is provided, after a certain amount of period has passed after the work machine stops, the hydraulic oil is all discharged from the case 10, and the oil surface is lower than the bottom surface (here, the plate-like portion 22a) of the filter element 20. Therefore, the filter element 20 is not immersed in the hydraulic oil, and the used filter element 20 from which the oil is drained is extracted. As a result, a drip of the hydraulic oil to the outside of the return filter 1 is less likely to occur, thus facilitating maintenance.

While in the present embodiment, the flange portion 31 is provided with the indicator 63, various sensors other than the indicator 63 can be attached to the flange portion 31. For example, providing a temperature sensor in the flange portion 31 allows measuring a temperature inside the space S2.

While in the present embodiment, the flow path 35 communicates between the space S2 and the space S3, the flow path 35 only needs to communicate between the internal space of the case 10 and the external space of the case 10. For Example, a flow path that communicates between the space S2 and the external space of the tank 100 may be provided in the lid body 30. In this case as well, the air can pass through the flow path and be flown into the inside of the case 10 while the work machine stops. However, when the flow path communicates between the space S2 and the external space of the tank 100, for example, a valve is desirably provided in the flow path so that the hydraulic oil inside the case 10 does not flow out to the outside of the tank 100.

The embodiments of the invention are described above in detail with reference to the drawings. Specific configurations are not limited to the embodiments and also include changes in the design or the like within a scope that does not depart from the gist of the invention. For example, the above examples have been explained in detail in order to facilitate understanding of the present invention and are not necessarily limited to examples provided with the entirety of the configuration described above. In addition, the configuration of an embodiment may be partially replaced with the configuration of a different embodiment, or the configuration of the different embodiment may be added to, deleted from, or replaced with the configuration of the embodiment.

In addition, the term "substantially" is not to be understood as merely being strictly the same, and is a concept that includes errors and modifications to an extent that does not result in loss in identity. For example, the "substantially cylindrical shape" is a concept that includes a case where, for example, the shape can be placed in the same category as the cylindrical shape, and is not strictly limited to the cylindrical shape. Further, simple expressions such as orthogonal, parallel, and identical are not to be understood as merely being strictly, for example, orthogonal, parallel, and identical, and include being, for example, substantially parallel, substantially orthogonal, and substantially identical.

In addition, the term "vicinity" means to include a range of regions (which can be determined as desired) near a position serving as a reference. For example, the term "a vicinity of an end" refers to a range of regions vicinity the end, and is a concept indicating that the end may or needs not be included.

REFERENCE SIGNS LIST

1 Return filter
2 Suction strainer
10 Case
10a Opening end
11 Bottom surface
11a Mounting portion
11b Hole
12 Mounting member
13, 14 Tubular portion
20 Filter element
21 Filter medium
22 Outer tube portion
22a Plate-like portion
22b, 22c Tubular portion
22d Hole
22e Hole
23 Inner tube
24 Plate
24a Plate-like portion
24b, 24c Tubular portion
25 Plate
30 Lid body
31 Flange portion
31a Hole
31b, 31c, 31d Hole
32 Cover
32a, 32b Hole
35, 36 Flow path
40 Inflow portion
50 Outflow portion
61, 62 Sealing member
63 Indicator
64 Valve
64a Valve rod
64b Valve body
64c Valve seat
64d Elastic member
64e Flange
64f, 64g Hole
100 Tank
101 Bottom surface
102 Top surface
102a Opening
102b Hole
103 Side surface
104 Mounting plate
104a Through-hole
104b Hole
105 Partition plate

The invention claimed is:

1. A filter device, comprising:
a case having a substantially bottomed tubular shape with an open upper end;
a filter element having a substantially cylindrical shape provided inside the case;
a lid body provided on the case so as to cover the upper end of the case; and
an inflow portion and an outflow portion provided in the case, the inflow portion and the outflow portion communicating between an internal space and an external space of the case; and
a detector that detects an environmental parameter,
wherein:
the lid body includes a flange portion and a cover, the flange portion having a substantially cylindrical shape is fixed to the case, and the cover having a substantially plate shape is provided on an upper side of the flange portion so as to cover a hollow portion of the flange portion;
the cover is detachably provided to the flange portion,
the flange portion has a first hole;
the cover has a second hole;
the first hole and the second hole communicate between the space inside the case and the space outside the case;
the flange portion is sandwiched between the cover and the case; and
the flange portion has a third hole opened in a direction along a plane perpendicular to a central axis of the case having a substantially bottomed tubular shape, the detector being inserted in the direction into the third hole.

2. The filter device according to claim 1, comprising a valve provided on the cover, wherein
the valve includes a valve seat having a substantially cylindrical shape provided on the cover,
the valve seat has a fourth hole, and
the first hole, the second hole, and the fourth hole communicate between the space inside the case and the space outside the case.

3. The filter device according to claim 1,
wherein
the third hole is closed with the detector,
the first hole has one end opening to a side surface or a bottom surface of the third hole, and
the first hole and the second hole communicate between a space inside the third hole and the space inside the case.

4. The filter device according to claim 1, wherein
the case is provided inside a tank,
the lid body is provided on an upper side of the tank,
the second hole with a substantially U shape has both ends opening to a surface on a lower side of the lid body,
the first hole is a hole penetrating in a thickness direction of the flange portion, the tank has a fourth hole at a position overlapping with the first hole in a plan view, and the first hole, the second hole, and the fourth hole communicate between the space inside the case and a space outside the case and inside the tank.

5. The filter device according to claim 4, comprising a valve provided on the cover, wherein a fifth hole is formed in the valve, and the first hole, the second hole, the fourth hole, and the fifth hole communicate between the space inside the case and the space outside the case and inside the tank.

\* \* \* \* \*